UNITED STATES PATENT OFFICE.

EDWARD A. A. HOVEY AND ERBINE C. PHILLIPS, OF CHICAGO, ILLINOIS, ASSIGNORS TO THE A. ERKENBRECHER COMPANY, OF CINCINNATI, OHIO.

LAUNDRY DRESSING.

SPECIFICATION forming part of Letters Patent No. 349,648, dated September 21, 1886.

Application filed March 18, 1886. Serial No. 195,722. (No specimens.)

*To all whom it may concern:*

Be it known that we, EDWARD A. A. HOVEY and ERBINE C. PHILLIPS, both of Chicago, Cook county, Illinois, have jointly invented a new and useful Compound for Laundry Use, of which the following is a specification.

Our invention relates to a new and useful adhesive, stiffening, and glazing dressing material or compound for the use of launderers, which possesses a number of important advantages. For example, this compound, when prepared as hereinafter explained, requires in use no boiling or other preparation than simply mixing with cold or luke-warm water, and the property of the said compound is such that, when used in dressing goods composed of several plies or thicknesses—such as a shirt-collar, shirt-cuff, or the like—it causes intimate adhesion, not only of the textile components of each individual layer, but also of the consecutive layers to one another, and thus enables the finished garment to maintain its proper shape free from rumpling, &c. Its utility is further seen in the readiness with which goods treated by it take on an even glazed and lustrous finish when subjected to the ordinary treatment by ironing or calendering.

The word "adhesive" when employed in this specification relates exclusively to the capacity of the compound to act as an interior bond, as hereinabove explained, the goods thus treated being, nevertheless, exceptionally free from stickiness of the exterior surfaces in the process of ironing.

Our said stiffening, glazing, and adhesive material or dressing is compounded as follows: We take of starch of Indian corn or other grain, one hundred pounds; of dextrine, three to ten pounds; of borax, two to five pounds; of alum, one-half to one pound. These ingredients are, either before or after mixing, reduced to a pulverulent condition, and having been thoroughly blended the compound is then ready either for immediate use or to be packed in any convenient merchantable form.

We prefer to use for our compound dextrine made from potato-starch, and preferably such dextrine as will show a decided starch reaction to the usual tests. We find the presence of potato-starch beneficial; but with dextrine deficient in such starch we use a less quantity of dextrine than that above given—say to the amount of two to five pounds—and add two to five pounds of potato-starch, known commercially as "potato-flour." The above proportions may be varied as to the relative quantities of dextrine and potato-starch according to the amount of starch present in the dextrine, and the proportions of alum may be varied according to whether the starch used be more or less alkaline. Where the starch is found to be not at all alkaline or even slightly acid the alum may be dispensed with.

We do not confine ourselves to the exact proportions here given, as the same may be slightly varied with different qualities of starch and dextrine.

We claim as new and of our invention—

1. The compound of starch of corn or other grain with dextrine, borax, and alum, in the proportions substantially as specified.

2. The compound of starch of corn or other grain with dextrine, potato-starch, borax, and alum, substantially as and for the purpose described.

3. The compound of starch of corn or other grain with dextrine and borax, as and for the purpose explained.

4. The compound of starch from corn or other grain with dextrine, potato-starch, and borax, for the purpose designated.

In testimony of which invention we hereunto set our hands.

EDWARD A. A. HOVEY.
    ERBINE C. PHILLIPS.

Witnesses to signature of E. A. A. Hovey:
    JAS. H. REED,
    G. W. WINNES, Jr.

Witnesses to signature of Erbine C. Phillips:
    OTIS S. FAVOR,
    HENRY N. MANN.